…

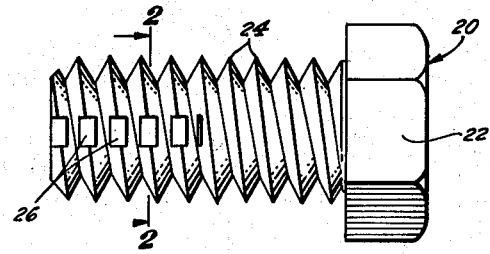
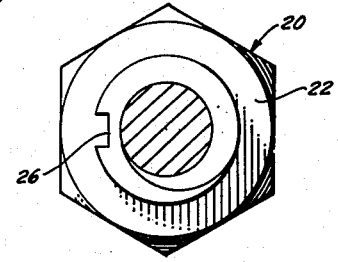
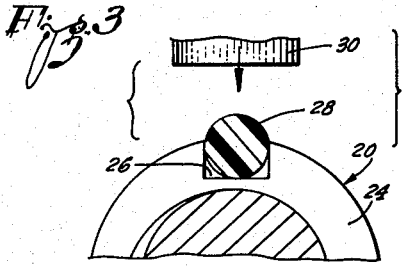
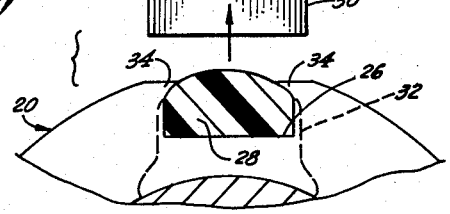
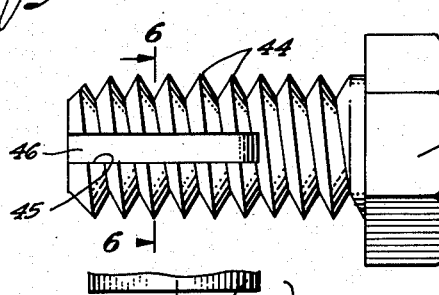
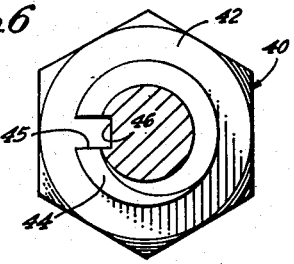
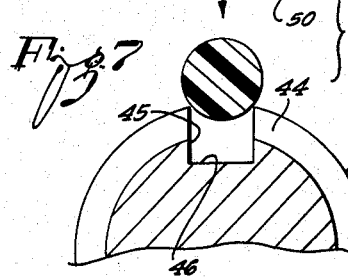
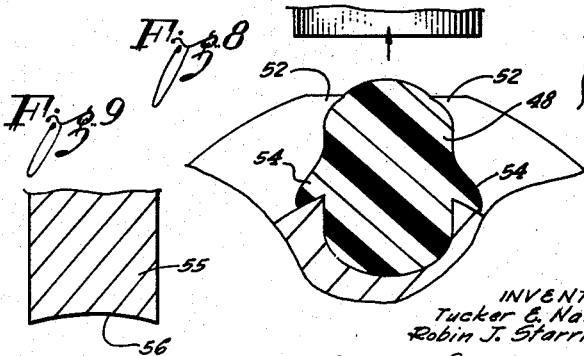
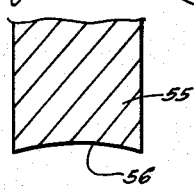

United States Patent Office 3,182,702
Patented May 11, 1965

3,182,702
SELF-LOCKING FASTENER AND METHOD OF MAKING SAME
Tucker E. Nason, Portuguese Bend, and Robin J. Starriett, Encino, Calif., assignors to Long-Lok Corporation, Los Angeles, Calif., a corporation of California
Filed Sept. 13, 1962, Ser. No. 223,374
3 Claims. (Cl. 151—7)

This invention relates to a self-locking screw-threaded fastening member of the type in which the self-locking action is achieved by means of a resiliently deformable plastic insert seated in a recess that cuts across the turns of the screw thread. The fastening member may be of the general character of a screw for engagement by a complementary element such as a nut or may be of the general character of a nut for engagement by a complementary element in the form of a screw.

The invention employs a recess in the fastening member in the form of a longitudinal groove that cuts across several turns of the screw thread and the invention is directed to the two problems of retaining the insert in the groove prior to use and of anchoring the insert against longitudinal movement and buckling in the groove when the fastening member is put to use.

With reference to the first problem of retaining an insert in the groove prior to use, various expedients may be employed, but it is not economically desirable to use an anchoring procedure that requires an additional operation in the fabrication procedure. It is for this reason that an insert is commonly squeezed into the groove for retention solely by friction, the insert being made oversized for this purpose. There is need for some better provision for locking the inserts in place in a more positive manner without adding to the cost of the fabrication procedure.

With reference to the second problem, it is well known that when a self-locking screw of this type is initially tightened for service the rotation of the screw relative to the nut or other complementary element engenders forces of high magnitude that tend to shift the insert longitudinally in its groove. Any such slippage on the part of the insert weakens the self-locking action. It has heretofore been suggested that slippage may be combated by distorting the insert laterally into interlocking engagement with the turns of the screw thread adjacent the two sides of the groove. The interlocking is useful because it provides a series of longitudinally spaced anchorage points for the insert. Unfortunately, however, since the insert is usually retained in the groove solely by friction, the insert may buckle outward under the force of the advancing thread of the complementary element, the buckled portion of the insert being loosened from interlocking engagement with the screw. It is desirable, therefore, to provide more effective anchorage against longitudinal slippage of the insert.

The present invention solves both of these problems of retaining an insert before and during use by installing the insert in the groove and deforming the crests of the cut turns of the screw thread in a single operation. The deformed crests of the screw thread overhang both the groove and the outer surface of the insert in positive gripping engagement with the insert. Since the crests of the cut turns of the screw thread are deformed in the course of the single operation of installing the insert, no additional labor cost is involved.

As heretofore stated, the insert may be deformed into interlocking engagement with the turns of the screw thread adjacent the groove to provide a first series of longitudinally spaced anchorage points. The clinching of the crests of the cut turns of the screw thread inward into engagement with the insert provides a second series of longitudinally spaced anchorage points, the points of the second series alternating with the points of the first series. In addition, the deformed crests of the screw thread overhang the installed insert at longitudinally spaced points in such manner as to keep the insert from buckling.

The features and advantages of the invention may be understood from the following detailed description and the accompanying drawing.

In the drawing, which is to be regarded as merely illustrative:

FIG. 1 is a side elevational view of a screw with a longitudinal groove therein, the groove comprising an aligned series of notches in successive turns of the screw thread;

FIG. 2 is a transverse section along the line 2—2 of FIG. 1 showing how the bottoms of the notches lie between the major and minor diameters of the screw thread;

FIG. 3 is a sectional view showing an impact tool poised to drive the insert into the groove;

FIG. 4 is a similar view somewhat enlarged, showing how the impact of the tool not only installs the insert in the groove but deforms the adjacent cut ends of the screw thread into positive engagement with the insert;

FIG. 5 is a side elevational view of a screw with a relatively deep longitudinal groove cut in the screw threads;

FIG. 6 is a transverse section along the line 6—6 of FIG. 5 showing how the bottom of the groove extends inside the inner diameter of the screw thread;

FIG. 7 is a sectional view showing an impact tool poised to drive the insert into the groove;

FIG. 8 is a similar view somewhat enlarged, showing how the impact of the impact tool not only seats the insert in the groove but also deforms the crests of the screw thread into positive engagement with the insert; and FIG. 9 is a sectional view of an impact tool having a concave impact face.

In the first practice of the invention illustrated by FIGS. 1 to 4, a screw, generally designated 20, has a hexagonal head 22 and a shank portion which is formed with a screw thread 24. In preparation for providing the screw with a longitudinal plastic insert, the screw is formed with a longitudinal groove which cuts through turns of the screw thread beginning at the leading end of the screw. In this particular embodiment of the invention, the longitudinal groove is cut to a depth at approximately the pitch diameter of the screw thread 24. As a consequence, the groove actually comprises a longitudinal series of spaced aligned notches 26 in the turns of the screw thread, each notch truncating a turn of the screw thread.

An insert 28 in the form of an elongated solid body of a suitable resiliently deformable plastic material such as nylon, is positioned longitudinally of the groove as indicated in FIG. 3 in preparation for seating the insert in the groove by force, preferably impact force. In the construction shown the insert 28 is of circular cross section but the insert may be of any suitable initial cross-sectional configuration.

With the insert initially positioned as shown in FIG. 3 and with the screw 20 suitably supported to withstand lateral force, an impact tool 30 is advanced against the insert with substantial impact force as indicated by FIGS. 3 and 4. The impact tool 30 forces the plastic body 28 into the groove with sufficient force to seat and deform the insert in the manner indicated in FIG. 4.

Under the impact force the insert 28 is compressed against the bottoms of the notches to completely fill the notches 26 as shown in FIG. 4 and the insert is deformed to straddle each of the notches 26 and to extend to the bottoms of the valleys of the screw thread with the plastic material bulging laterally in each valley as indicated by the broken lines 32 in FIG. 4.

The impact tool 30 has an impact face that is wider than the groove and as the impact tool completes its stroke to drive the plastic insert 28 into its seat and compress the insert against the bottom surface of the groove in the manner described, the tool encounters the cut ends of the crests of the turns of the screw head 24 at the opposite side edges of the groove and deforms the crests. The resulting deformed ends of the screw thread overhang both the outer surface of the insert and the groove in which the insert is seated. Thus the deformed portions 34 of the screw thread on the opposite sides of each of the notches 26 positively engage the insert from its outer side and clamp the insert against the bottom walls of the notches 26.

Since the insert 28 straddles the truncated portions of the screw thread at each of the notches 26 and additionally bulges laterally into engagement with the screw thread, the insert is anchored against longitudinal slippage at what may be termed a first series of longitudinal spaced points, the spaced points being at the valleys of the screw thread. It is apparent that the deformed portions 34 of the cut turns of the screw thread engage the insert at what may be termed a second series of longitudinally spaced points, the two series being staggered with the anchorage points of the two series alternating. It is further apparent that the numerous overhanging deformed portions 34 prevent the insert from buckling out of engagement with the valleys of the screw thread. It is apparent from a comparison of FIGS. 3 and 4 that the insert is compressed in thickness by approximately ⅓ and is confined in the highly compressed state by the overhanging deformed portions 34 of the cut ends of the screw thread. If the insert is made of nylon which has plastic memory, the insert will tend gradually to return to the circular cross section shown in FIG. 3 and consequently internal stress will build up in the material, the internal stress acting against the overhanging deformed portion 34 of the ends of the screw thread.

When a complementary nut is threaded onto the screw 20 with the insert 28 installed therein in the described manner, the leading end of the internal screw thread of the nut advances helically along the helical valley of the screw thread 24 and progressively crowds the plastic material of the insert into its seat. Thus the plastic material in the region of each of the notches 26 is progressively compressed and at the same time the advancing internal screw thread progressively restricts the avenues of escape from the notches by progressively occupying greater portions of the valleys of the screw thread 24 adjacent each of the notches 26. Since the advancing internal screw thread of the nut straddles the notches 26 and enters the valleys on the opposite sides of each notch, the displacement of the material from the valleys on opposite sides of each notch tends to crowd the material of the insert into each of the notches. With the avenues of escape displacement progressively restricted, fluid pressure of high magnitude is created in each portion of the insert material that is trapped in a notch 26. The crowding action places the portions of plastic material in each notch under high pressure because the crowding action occurs from both sides of each notch simultaneously and because the only avenues of displacement escape are along the helical paths provided by the clearance between the screw thread 24 of the screw and the internal screw thread of the nut.

In the second embodiment of the invention shown in FIGS. 5 to 8 a screw, generally designated 40, has the usual head 42 and screw thread 44. A longitudinal groove 45 cuts across the turns of the screw thread 44 and in this instance the groove 45 opens on the leading end of the screw. As shown in the drawing, the groove 45 is cut relatively deep, the bottom 46 of the groove lying inside the minor diameter or root diameter of the screw thread.

FIG. 7 shows how an insert 48 of suitable plastic material such as nylon, may be initially positioned along the groove 45 so that the insert may be driven into the groove by an impact tool 50 having an impact face that is wider than the groove. Here again the impact tool 50 not only seats the insert 48 in the groove 45 but also deforms or clinches the crest portions of the interrupted screw thread 44 to cause deformed portions 52 of the screw thread to overhang the groove and to bite into the insert for positive engagement with the insert.

Here again the installed insert is anchored against longitudinal movement relative to the groove at two series of spaced points, the two series being staggered. The first series of anchorage points is where the material of the installed insert 48 bulges into the valleys of the screw thread on opposite sides of the groove, the laterally bulged portions of the insert being indicated at 54 in FIG. 8. The second series of anchorage points is where the overhanging deformed portions 52 of the screw thread bite into the insert. The deformed portions 52 of the screw thread not only form the second series of anchorage points to prevent longitudinal shift of the insert but also function in a positive manner to prevent buckling of the insert radially outwardly of the groove.

In both practices of the invention the cross-sectional area of the insert which determines the volume of the insert is selected to cause the insert to fill the groove and in addition to bulge into the adjacent valleys of the screw thread to provide the first series of anchorage points. In both practices of the invention the impact tool has a substantially planar impact face but it is to be understood that the impact face of an impact tool may have other configurations. FIG. 9, for example, shows an impact tool 55 with a concave impact face 56, the concavity of the impact face resulting in more pronounced deformation and displacement of the ends of the turns of the screw thread on the opposite sides of a groove into which an insert is to be mounted.

Our description in specific detail of the selected practices of the invention will suggest various changes, substitutions and other departures from our disclosure within the spirit and scope of the appended claims.

We claim:

1. A fastening assembly for cooperation with a complementary threaded element comprising:
   a fastening member having a portion with a screw thread for engagement with the thread of said complementary element;
   a longitudinal groove in said portion cutting through the turns of the screw thread with cut portions of the turns of the screw thread terminating at the opposite sides of the groove;
   an elongated resiliently deformable plastic insert bottomed in said groove and extending outwardly to at least the pitch diameter of said screw thread both in the regions of the turns of the screw thread and in the regions of the valleys formed by the turns of the screw thread and protruding laterally from the groove at a plurality of points at each side of the groove in interlocking engagement with portions of the turns of the screw thread immediately adjacent the groove to anchor the insert against longitudinal movement at a first series of longitudinally spaced points and to make pressure contact with said thread of the complementary element, crest portions only of said cut portions of the turns of the screw thread overhanging the groove and the outer surface of the insert from opposite sides of the groove and being deformed to press on the outer surface of the insert to retain the insert under permanent transverse compression against the bottom of the groove and to prevent buckling of the insert and to anchor the insert against longitudinal movement at a second series of longitudinally spaced points, the two series of points being staggered, the longitudinal portions of the insert between the successive crest portions of said cut portions constituting the major portion of the length of the insert and being free from restraint by overhanging material of the screw thread.

2. A combination as set forth in claim 1 in which the bottom of the groove lies inside the minor diameter of the screw thread.

3. A fastening assembly for cooperation with a complementary threaded element comprising:

a fastening member having a portion with a screw thread for engagement with the thread of said complementary element;

a series of aligned notches in successive turns of said screw thread cutting the turns of the screw thread with the bottoms of the notches outside of the minor diameter of the screw thread whereby the notches form truncated portions of the screw thread;

an elongated resiliently deformable plastic insert extending through said notches and extending to the roots of the screw thread between the notches to straddle said truncated portions of the screw thread, said insert protruding on its two sides laterally into the valleys formed by the screw thread for interlocking engagement with the screw thread to anchor the insert against longitudinal movement at a first series of longitudinally spaced points, crest portions only of the screw thread being deformed to overhang said notches and the outer surface of the insert and to clamp the insert under transverse compression against the bottoms of the notches to retain the insert in the groove in a positive manner and to prevent buckling of the insert and to anchor the insert against longitudinal movement at a second series of longitudinally spaced points, the two series of points being staggered, said insert spanning the valleys and extending radially outward in the valleys to at least the pitch diameter of the screw thread for pressure contact with said thread of the complementary element.

References Cited by the Examiner
UNITED STATES PATENTS

| | | | |
|---|---|---|---|
| 2,333,388 | 11/43 | Poupitch | 151—7 |
| 2,520,121 | 8/50 | Brutus | 151—7 |
| 2,913,031 | 11/59 | McKay et al. | 151—7 |
| 2,956,293 | 10/60 | McKay et al. | 10—10 |
| 3,020,570 | 2/62 | Wallace et al. | 10—10 |

EDWARD C. ALLEN, *Primary Examiner.*